(12) United States Patent
Uda

(10) Patent No.: US 9,273,790 B2
(45) Date of Patent: Mar. 1, 2016

(54) ELECTRIC DRIVING APPARATUS

(71) Applicant: DENSO CORPORATION, Kariya, Aichi-pref. (JP)

(72) Inventor: Toshiaki Uda, Miyoshi (JP)

(73) Assignee: DENSO CORPORATION, Kariya (JP)

( * ) Notice: Subject to any disclaimer, the term of this patent is extended or adjusted under 35 U.S.C. 154(b) by 271 days.

(21) Appl. No.: 13/934,275

(22) Filed: Jul. 3, 2013

(65) Prior Publication Data

US 2013/0293174 A1 Nov. 7, 2013

Related U.S. Application Data

(62) Division of application No. 13/171,845, filed on Jun. 29, 2011, now abandoned.

(30) Foreign Application Priority Data

Jun. 30, 2010 (JP) .................................. 2010-149284
Jul. 15, 2010 (JP) .................................. 2010-160184

(51) Int. Cl.
*H02K 17/32* (2006.01)
*F16K 31/04* (2006.01)
(Continued)

(52) U.S. Cl.
CPC .............. *F16K 31/046* (2013.01); *F02B 31/06* (2013.01); *F02D 11/107* (2013.01); *F16K 31/043* (2013.01); *F16K 31/047* (2013.01); *F16K 37/0041* (2013.01); *H02P 29/00* (2013.01);
(Continued)

(58) Field of Classification Search
USPC ......... 318/430, 434, 494, 465, 265, 365, 650, 318/144, 148, 400.22, 400.12, 671, 626, 318/62; 251/60, 92, 284, 288, 129.12; 123/568.19, 568.26, 568.25, 406.52, 123/683, 462

See application file for complete search history.

(56) References Cited

U.S. PATENT DOCUMENTS 5,463,298 A * 10/1995 Kamio ................. F02D 11/106
192/103 R
6,283,150 B2   9/2001 Apel et al.
(Continued)

FOREIGN PATENT DOCUMENTS

GB    2 393 718       3/2004
JP    07-272078      10/1995
(Continued)

OTHER PUBLICATIONS

Japanese Office Action dated Aug. 7, 2012, issued in corresponding Japanese Application No. 2010-160184 With English translation.
(Continued)

*Primary Examiner* — Shawki S Ismail
*Assistant Examiner* — Jorge L Carrasquillo
(74) *Attorney, Agent, or Firm* — Nixon & Vanderhye PC

(57) ABSTRACT

A valve control apparatus is provided with a valve, a shaft supporting the valve, an end-gear of an actuator driving the valve. The shaft is press-inserted into the end-gear. A stopper disposed on the shaft regulates a valve operation range. The end-gear can engage with the middle gear of the reduction-gears mechanism even in out of the gear-operation-angle range. When a rotation angle sensor detects a rotation angle of the end-gear in out of the gear-operation-angle range, it is determined that a malfunction occurs in a rotation-force-transmitting path.

7 Claims, 14 Drawing Sheets

(51) Int. Cl.

| | |
|---|---|
| *F02B 31/06* | (2006.01) |
| *F02D 11/10* | (2006.01) |
| *F16K 37/00* | (2006.01) |
| *H02P 29/00* | (2006.01) |

(52) U.S. Cl.
CPC ..... *F02B2275/48* (2013.01); *F02D 2200/0404* (2013.01); *Y02T 10/125* (2013.01); *Y02T 10/146* (2013.01)

(56) References Cited

U.S. PATENT DOCUMENTS

| | | |
|---|---|---|
| 6,288,534 B1 | 9/2001 | Starkweather et al. |
| 7,028,979 B2 | 4/2006 | Fauni |
| 7,084,594 B2 * | 8/2006 | Itabashi ............... F02D 11/107 318/400.22 |
| 7,143,743 B2 * | 12/2006 | Uda et al. ................ 123/399 |
| 7,543,794 B2 | 6/2009 | Kouzu et al. |
| 2002/0050256 A1 * | 5/2002 | Takahashi et al. ......... 123/90.12 |
| 2002/0088956 A1 * | 7/2002 | Ozawa ................... F16K 37/00 251/129.01 |
| 2009/0007875 A1 | 1/2009 | Sano et al. |
| 2012/0001105 A1 | 1/2012 | Hayashi |

FOREIGN PATENT DOCUMENTS

| | | | |
|---|---|---|---|
| JP | 07272078 A | * | 10/1995 |
| JP | 8-19172 | | 1/1996 |
| JP | 08019172 A | * | 1/1996 |
| JP | 2001-004674 | | 1/2001 |
| JP | 2001004674 A | * | 1/2001 |
| JP | 2002-315348 | | 10/2002 |
| JP | 2005-131766 | | 6/2005 |

OTHER PUBLICATIONS

Office Action (10 pages) dated Aug. 2, 2013, issued in copending U.S. Appl. No. 13/171,845 of Hayashi, filed Jun. 29, 2011.

* cited by examiner

| AMBIENT TEMP: T | −40 | −20 | 0 | 20 | 60 | 100 |
|---|---|---|---|---|---|---|
| CONDUCTANCE: P(T) | P(−40) | P(−20) | P(0) | P(20) | P(60) | P(100) |

ELECTRIC DRIVING APPARATUS

CROSS-REFERENCE TO RELATED APPLICATION

This application is a divisional of application Ser. No. 13/171,845, filed on Jun. 29, 2011, and claims priority from Japanese Patent Applications No. 2010-149284 filed on Jun. 30, 2010, and No. 2010-160184 filed on Jul. 15, 2010, the disclosures of which are incorporated herein by reference.

FIELD OF THE INVENTION

The present invention relates to a valve control apparatus including a valve and an actuator. The valve opens/closes a fluid-passage and the actuator drives the valve. Especially, the valve control apparatus is used for opening/closing an intake passage communicating with a combustion chamber of an internal combustion engine. Further, the present invention relates to an electric driving apparatus which drives a driven member by use of a driving force of an electric motor.

BACKGROUND OF THE INVENTION

Conventionally, a valve control apparatus has a valve which opens/closes an intake passage communicating with a combustion chamber of an internal combustion engine, a shaft supporting the valve, and an actuator driving the valve in order to control an intake air flow rate. The actuator has an end-gear receiving a driving force from an electric motor (driving source). The end-gear is connected to the shaft, so that the valve and the actuator are connected to each other. Refer to JP-2004-124933A (GB-2393218A) and JP-2009-013934A (US-2009/0007875A1).

FIG. 6 shows a valve control apparatus 100 shown in JP-2004-124933A. An actuator 101 is provided with an end-gear 103 which is made of resin material and receives a driving force from an electric motor (driving source). A shaft 104 made of metallic material is press-inserted into a hole 106 of the end-gear 103, whereby the shaft 104 is connected with the end-gear 103. A rotation of the end-gear 103 is transmitted to the valve 107 through the shaft 104.

A housing 109 has a stopper (not shown) to which a stopper-portion (not shown) of the end-gear 103 confronts so that an operation range of the valve 107 is regulated. That is, the stopper regulates an angular operation range of the end-gear 103 so that the operation range of the valve 107 is restricted. Further, the valve control apparatus 100 is provided with a sensor (not shown) which detects a rotational angle of the end-gear 103, so that a position of the valve 107 is detected.

In this valve control apparatus 100, since the valve 107 is connected to the actuator 101 by press-inserting the shaft 104 into the end-gear 103, its manufacturing cost is relatively low.

However, in this valve control apparatus 100, if a press-inserting portion between the shaft 104 and the end-gear 103 is damaged, the sensor detecting the rotational angle of the end-gear 103 can not detect this malfunction. That is, a malfunction in a driving-force-transmitting path can not be detected.

If the press-inserting portion is broken, it is likely that the rotation of the end-gear 103 is restricted by the stopper and only the shaft 104 may spin free. In such a case, even though the valve 107 is restricted by the stopper, the valve 107 rotates over a restricted range. Since the sensor detects only the rotational angle of the end-gear 103, it can not be detected that the valve 107 rotates over the normal range.

In order to detect the above malfunction, it is conceivable that another sensor directly detecting a rotational angle of the shaft 104 is necessary. However, another sensor increases the manufacturing cost.

FIG. 7 shows a valve control apparatus 200 shown in JP-2009-013934A. A sensor 201 directly detects a rotational angle of a shaft 202 so that an opening degree of the valve 203 is detected. If the shaft 202 rotates over a normal rotational range of the valve 203 due to a breakage in a connection portion between a shaft 202 and an end-gear 204, the sensor 201 outputs a detection value which indicates that the rotational angle of the shaft 202 is abnormal. Thus, it can be detected that the valve 203 has a malfunction.

However, in this valve control apparatus 200, a configuration of connecting portion between the valve 203 and the actuator 205 becomes complicated. Further, a gear-holding member 206 for connecting the end-gear 204 to the shaft 202 and a sensor-holding member 208 for holding a magnet 207 on the shaft 202 are necessary, which increase the number of parts and increase the manufacturing cost. Thus, even in the valve control apparatus 200, a malfunction in a connecting portion between the shaft 202 and the end-gear 204 is not detected with low cost.

It is well known that an electric driving apparatus drives a valve, which corresponds to a driven member, by use of a driving force of an electric motor. The electric driving apparatus is applied to a valve control apparatus for an internal combustion engine, which adjusts an intake air quantity or an exhaust gas quantity.

The electric driving apparatus is provided with a mechanism which holds a mechanical position of the driven member. For example, in a case that the electric driving apparatus is applied to a tumble-control-valve (TCV) apparatus, a reduction-gears mechanism is provided with a stopper so that the driven member is mechanically held at a full-open position or a full-close position.

In such an electric driving apparatus, when the driven member is mechanically held, the electric current supplied to the electric motor is stepwise increased. For example, when the TCV-apparatus rotates a tumble-control valve toward the full-close position, the electric current supplied to the electric motor varies as shown in FIG. 17. That is, when the electric motor is energized, the electric current is temporarily rapidly increased due to an inrush current, and then the electric current is decreased. When the unheld driven member is mechanically held, the electric current supplied to the electric motor is stepwise increased. When the driven member is not mechanically held, the condition of the driven member is referred to as an unhold condition, hereinafter. Also, when the driven member is mechanically held, the condition of the driven member is referred to as a hold condition, hereinafter.

It has been needed to correctly determines whether the condition of the driven member is normally changed from the unhold condition to the hold condition without respect to the stepwise increase in the electric current.

JP-8-19172A and JP-2005-151766A show an electric circuit configuration in which it is determined that a malfunction occurs when the electric current supplied to the electric motor exceeds a specified threshold. However, in this electric circuit, the change from the unhold condition to the hold condition is not determined as a normal change.

JP-2001-4674A shows an electric circuit configuration in which the supplied electric current is integrated so that an over-current due to a short circuit is distinguished from a normal electric current increase due to the condition change from the unhold condition to the hold condition. However, in

SUMMARY OF THE INVENTION

The present invention is made in view of the above matters, and it is an object of the present invention to provide a valve control apparatus which enables to detect a malfunction with low cost.

Also, the present invention is made in view of the above matters, and it is another object of the present invention to provide an electric driving apparatus which is able to determine whether a driven member is surely moved from the unhold condition to the hold condition.

According to the present invention, a valve control apparatus has a valve opening/closing a fluid passage, a shaft supporting the valve and an actuator driving the valve. The shaft is press-inserted into a press-insert hole formed in an end-gear of the actuator.

Since the valve is connected to the actuator by press-inserting the shaft into the end-gear, its manufacturing cost can be made lower.

Further, the shaft has an exposed portion which is out of the press-insert hole. A stopper radially extending from the exposed portion is provided to the shaft. A housing has a stopper surface with which the stopper is brought into contact, so that a valve operation range is regulated. Still further, the valve control apparatus has a sensor detecting a rotation angle of the actuator, and a malfunction detecting means for detecting a malfunction in a rotation-force-transmitting path to the shaft.

The end-gear has gear teeth comprised of inside gear teeth and outside gear teeth. The inside gear teeth engages with the gear of the motor in a gear-operation-angle range of the end-gear which corresponds to the valve operation range. The outside gear teeth engage with the gear of the motor in out of the gear-operation-angle range. The end-gear can engage with a gear of a motor even in out of the gear-operation-angle range.

The malfunction detecting means determines that a malfunction occurs when the end-gear rotates over the gear-operation-angle range and the detection value of the sensor is out of the normal detection values corresponding to the valve operation range.

According to the above, by detecting the rotation angle of the actuator, a malfunction in a rotation-force-transmitting path can be detected. Thus, it is unnecessary to directly detect the rotation angle of the shaft in order to find a malfunction. The manufacturing cost is not increased. A damage of a connecting portion of the shaft and the end-gear can be detected with low cost.

According to the present invention, an electric driving apparatus includes an electric motor generating a driving force while receiving an electric current; an electric current detecting means for detecting the electric current supplied to the electric motor; and a control means for controlling an energization to the electric motor so that the driving force is transmitted to a driven member in order to vary a displacement magnitude which represents at least one of a variation in position of the driven member and a variation in posture of the driven member.

The displacement magnitude includes a hold value at which the driven member is mechanically held and the displacement magnitude does not vary even though the driving force is continued to be transmitted from the electric motor to the driven member so as to vary the displacement magnitude in one direction. The electric current supplied to the electric motor is stepwise increased when the displacement magnitude reaches the hold value after the displacement magnitude has been varied in one direction.

The control means stores a threshold regarding the electric current supplied to the electric motor for determining whether the displacement magnitude normally reaches the hold value in a case that the electric motor is controlled in such a manner that the displacement magnitude reaches the hold value after the displacement magnitude has been varied in one direction. After the electric motor is energized, the electric current exceeds the threshold temporarily due to the inrush current. Then, the electric current is lowered than the threshold. After that, when the electric current excesses the threshold again, it is determined that the displacement magnitude normally reach the hold value.

Thereby, it can be able to determine whether the driven member is normally moved from the unhold condition to the hold condition.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

[First Embodiment]
[Structure of First Embodiment]

Figure 1:
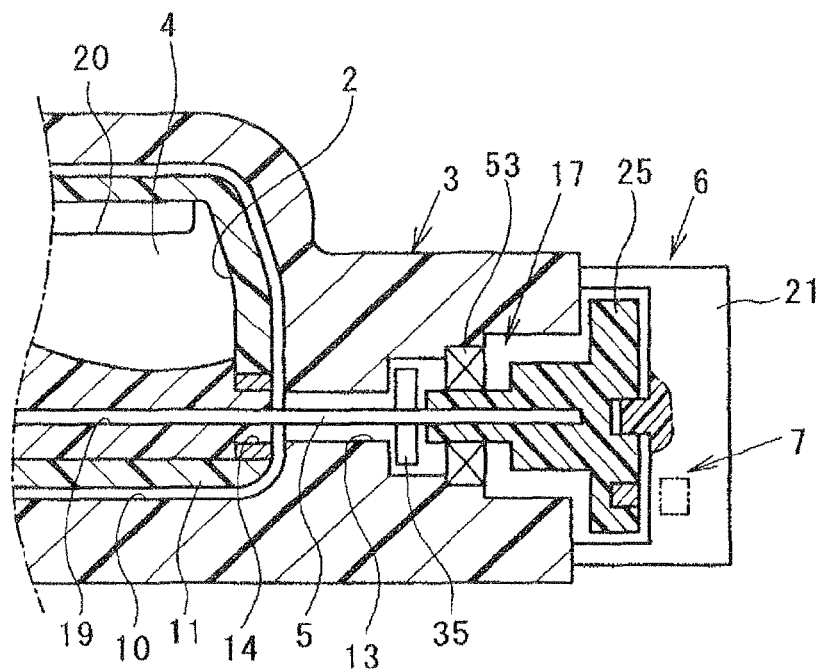
FIG. 1 is a fragmentally sectional view showing a tumble-control-valve control apparatus according to a first embodiment.
Figure 2:
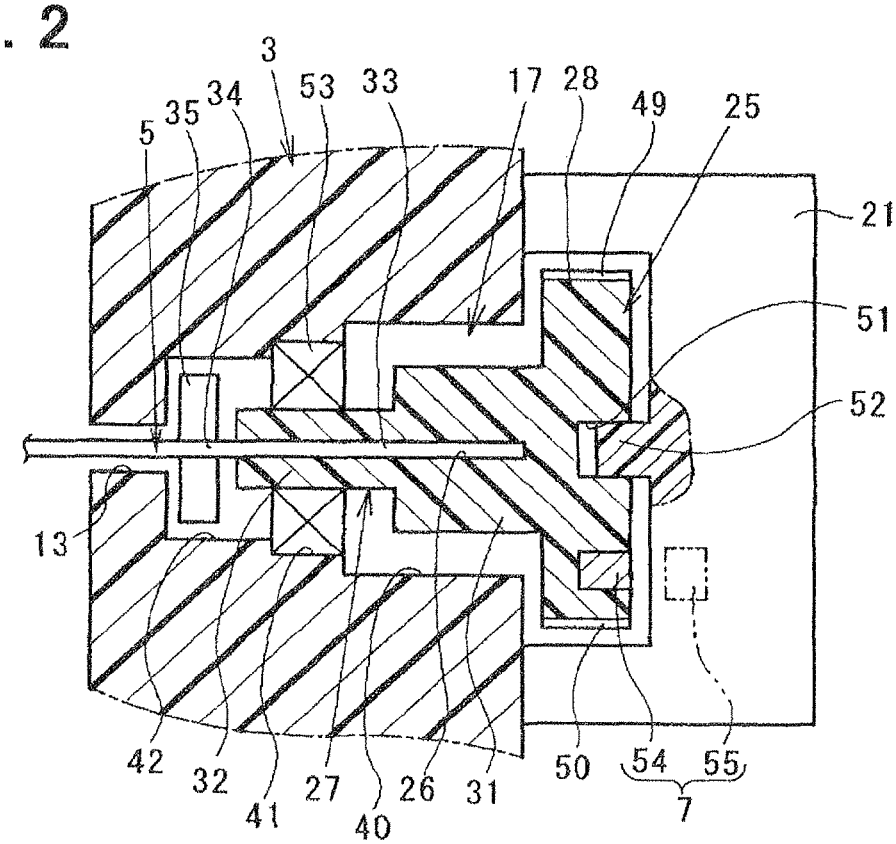
FIG. 2 is an enlarged cross sectional view showing an essential portion of the tumble-control-valve control apparatus according to the first embodiment.

Referring to FIGS. 1 to 3, a first embodiment of the present invention will be described. In this embodiment, the present invention is applied to a tumble-control-valve control apparatus, which is referred to as a TCV control apparatus, hereinafter. The TCV control apparatus adjusts flow passage areas of intake passages 2 each of which communicates with a combustion chamber of each cylinder of an internal combustion engine, whereby tumble flow is generated in each combustion chamber.

The TCV control apparatus is provided with an intake manifold (housing) 3 defining an intake passages 2 therein, a valve 4 opening/closing the intake passage 2, a shaft 5 supporting the valve 4, an electronic actuator 6 driving the valve 4 through the shaft 5, a rotation angle sensor 7 detecting an opening degree of the valve 4, and an electronic control unit (ECU: not shown) receiving detection signals from the rotation angle sensor 7.

The intake manifold 3 is a casing which forms a plurality of intake passages 2 and is made of polyamide resin. Each of intake passages 2 has rectangular cross section and communicates with each intake port (not shown) of a cylinder head.

A tumble control valve, which is referred to as TCV hereinafter, is provided in the intake manifold 3 in order to generate tumble flow in the combustion chamber.

The TCV is comprised of a valve housing 11 accommodated in a housing storage chamber 10 of the intake manifold 3 and the valve 4 which is rotatably accommodated in the valve housing 11. The number of the housing storage chamber 10 is equal to the number of the cylinders. Each of the valve housings 11 is held in each housing storage chamber 10.

The intake manifold 3 and the valve housing 11 respectively have penetrating holes 13, 14 through which the shaft 5 is rotatably inserted.

The shaft 5 supports the valve 4 and its end portion is connected to the actuator 6. The shaft 5 is made of metallic material and has polygonal cross section.

Further, the intake manifold 3 has an accommodation chamber 17 which accommodates a part of the actuator 6. The intake passage 2 communicates with the accommodation chamber 17 through the penetrating holes 13, 14.

The valve 4 is made of polyamide resin. A rotation axis of the valve 4 extends in a direction perpendicular to an air flow direction in the intake passage 2. The valve 4 has a polygonal hole 19 through which the shaft 5 is inserted. The valve 4 and the shaft 5 rotate together. The cross section of the polygonal hole 19 is substantially the same as the cross section of the shaft 5, whereby a relative rotation between the shaft 5 and the valve 4 is prevented.

The valve 4 is rotated in the valve housing 11 to vary the flow passage area of the intake passage 2. When the flow passage area of the intake passage is reduced, the tumble flow is generated in the combustion chamber. Such a tumble flow improves a combustion efficiency and fuel economy, and reduces emissions.

As shown in FIG. 1, the valve 4 has a notch portion 20. When the valve 4 fully closes the intake passage 2, a rectangular aperture is defined between the valve 4 and the valve housing 11 by the notch portion 20. The intake air flows through this rectangular aperture, so that the tumble flow is generated in the combustion chamber.

When the valve 4 is fully opened in its operational range, the flow passage area of the intake passage 2 becomes maximum.

When the valve 4 is fully closed in its operational range, the flow passage area of the intake passage 2 becomes minimum.

It should be noted that the valve operational range represents a rotational angle range within which the valve 4 can be rotated.

The rotational angle range of the valve 4 is defined by stoppers (not shown). When the valve 4 is fully closed, one of stoppers is in contact with the valve 4. When the valve 4 is fully opened, the other stopper is in contact with the valve 4.

The actuator 6 is provided with an electric motor (not shown), a reduction-gears mechanism and an actuator case 21 which accommodates the reduction-gears mechanism.

The reduction-gears mechanism includes a motor gear connected to an output shaft of the electric motor, a middle gear engaging with the motor gear, and an end-gear 25 engaging with the middle gear.

The end-gear 25 made of polyamide resin has an engaging portion 27 and a gear portion 28. The engaging portion 27 defines a press-insert hole 26 therein. The gear portion 28 is engaged with the middle gear (not shown). The engaging portion 27 extends from the gear portion 28, and has a middle-diameter portion 31 and a small-diameter portion 32. The diameter of the middle-diameter portion 31 is smaller than that of the gear portion 28, and the diameter of the small-diameter portion 32 is smaller than that of the middle-diameter portion 31.

The press-insert hole 26 extends along a center axis of the small-diameter portion 32 and the middle-diameter portion 31. An end portion 33 of the shaft 5 is press-inserted into the press-insert hole 26, whereby the shaft is concentrically connected to the end-gear 25. The shaft 5 and the end-gear 25 rotate together. This end portion 33 of the shaft 5 is referred to as a press-insert portion 33. The cross section of the press-insert hole 26 is substantially the same as the cross section of the shaft 5, whereby a relative rotation between the shaft 5 and the end-gear 25 is prevented.

Figure 3A:
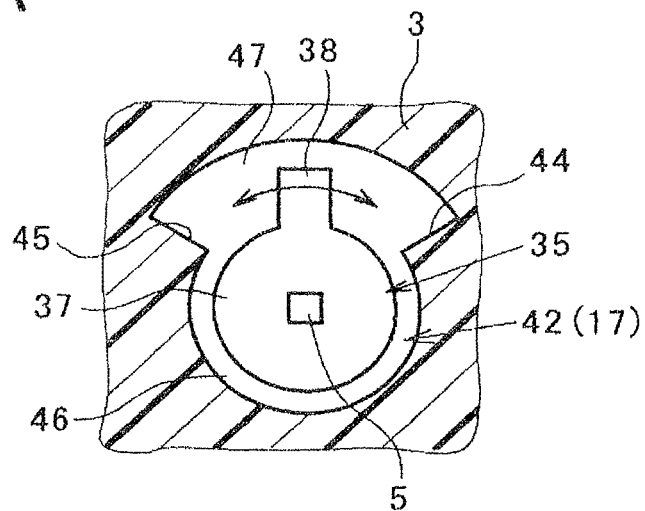
FIG. 3A is a cross sectional view showing a stopper.

The other portion of the shaft 5, which is not press-inserted into the hole 26, is referred to as an exposed portion 34. The exposed portion 34 is provided with a stopper 35 which radially extends. As shown in FIG. 3A, the stopper 35 is comprised of a disc portion 37 and a stopper-contacting portion 38 which radially outward protrudes from the disc portion 37.

The accommodation chamber 17 is comprised of a large chamber 40, a middle chamber 41, and a small chamber 42. The penetrating hole 13 communicates with the small chamber 42.

The middle-diameter portion 31 of the end-gear 25 is accommodated in the large chamber 40, and the small-diameter portion 32 is accommodated in such a manner as to extend from the large chamber 40 to the small chamber 42. The gear portion 28 is accommodated in the actuator case 21. The exposed portion 34 and the stopper 35 are accommodated in the small chamber 42.

As shown in FIG. 3A, the intake manifold 3 has two stopper walls 44, 45. The stopper-contacting portion 38 comes into contact with one of the stopper walls 44, 45, whereby the rotation of the shaft 5 is regulated and the operation range of the valve 4 is also regulated.

The stopper wall 44 corresponds to a full-close position of the valve 4 and the other stopper wall 45 corresponds to a full-open position of the valve 4. The small chamber 42 is comprised of a first small chamber 46 and a second small chamber 47. The disc portion 37 is accommodated in the first small chamber 46, and the stopper-contacting portion 38 is accommodated in the second small chamber 47. The stepped surfaces between the first small chamber 46 and the second small chamber 47 respectively correspond to the full-close stopper wall 44 and the full-open stopper wall 45.

When the stopper-contacting portion 38 is brought into a contact with the full-close stopper wall 44, the valve 4 is positioned at a full-close position. When the stopper-contacting portion 38 is brought into a contact with the full-open stopper wall 45, the valve 4 is positioned at a full-open position. The valve operation range is from the full-close position to the full-open position.

Figure 3B:
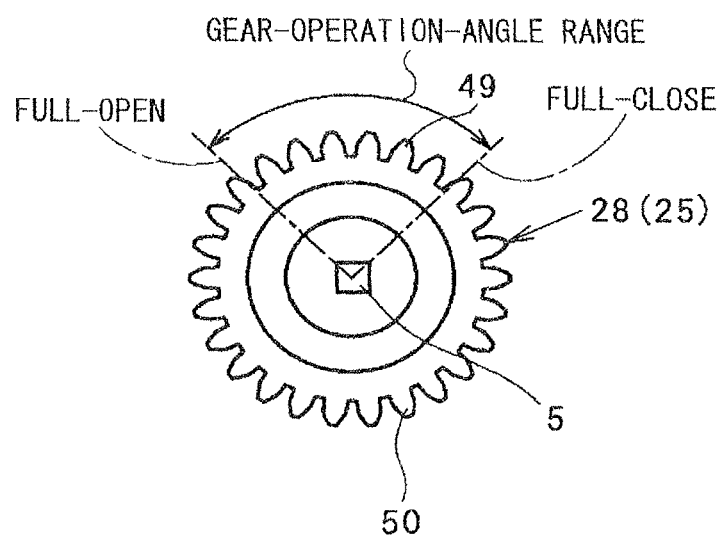
FIG. 3B is a plain view of an end-gear according to the first embodiment.

Further, since the end-gear 25 rotates along with the shaft 5 and the valve 4, an operation range of the end-gear 25 is also restricted as shown in FIG. 3B. That is, the operation range of the end-gear 25 is identical to the valve operation range. When the valve 4 is at the full-close position, the end-gear 25 is positioned at a full-close gear position. When the valve 4 is at the full-open position, the end-gear 25 is positioned at a full-close gear position.

The gear portion 28 has gear teeth which are able to engage with the middle gear of the reduction-gears mechanism even if the end-gear 25 rotates over the operation range. That is, the gear portion 28 has gear teeth which are comprised of inside gear teeth 49 engaging with the middle gear in the gear-operation-angle range and outside gear teeth 50 engaging with the middle gear in out of the gear-operation-angle range, as shown in FIG. 3B.

In the present embodiment, the gear portion 28 has the gear teeth 49, 50 along its entire circumferential periphery. The end-gear 25 can engage with the middle gear of the reduction-gears mechanism even in out of the gear-operation-angle range.

A concave portion 51 is formed on an end surface of the gear portion 28. The actuator case 21 has a protrusion 52 which is inserted into the concave portion 51, whereby the end-gear 25 is connected to the actuator case 21, as shown in FIG. 2.

The TCV control apparatus is provided with a seal member 53 (for example, an oil seal or an X-ring) between the engaging portion 27 and the accommodation chamber 17. An outer surface of the seal member 53 is in contact with an inner surface of the middle chamber 41, and an inner surface of the seal member 53 is in contact with an outer surface of the small-diameter portion 32. Thereby, the seal member 53 prevents an air-leakage from the intake passage 2 toward the actuator case 21. The maximum diameter of the stopper 35 is greater than that of the seal member 53.

The rotation angle sensor 7 includes a magnet 54 fixed in the end-gear 25 and a Hall element 55 detecting magnetic flux generated by the magnet 54. Specifically, the magnet 54 is fixed in the end-gear 25 by insert-molding, and the Hall element 55 is disposed on the actuator case 21.

The magnet 54 and the Hall element 55 are arranged in such a manner as to perform a relative movement to each other. When the end-gear 25 rotates, a relative position between the magnet 54 and the Hall element 55 is varied. The magnetic flux density passing through the Hall element 55 is also varied. Based on this variation in magnetic flux density, the rotation angle sensor 7 detects the rotation angle of the end-gear 25. Instead of the Hall element 55, a Hall IC or a magnetic resistance element can be used.

In the present embodiment, since the rotation angle of the shaft 5 holding the valve 4 is identical to the rotation angle of the end-gear 25, the opening degree of the valve 4 can be detected by obtaining the rotation angle of the end-gear 25.

The ECU has a microcomputer including a central processing unit (CPU), a read only memory (ROM), a random access memory (RAM), an input circuit, an output circuit and a timer.

The ECU functions as a valve position computing means for computing an opening degree of the valve 4 based on the detection value of the rotation angle sensor 7.

Also, the ECU functions as a malfunction detecting means for detecting a malfunction in a driving force transmitting path to the shaft 5.

The ECU stores the detection values detected by the rotation angle sensor 7, which correspond to the valve operation range, as normal detection values. That is, the ECU stores the detection value detected by the rotation angle sensor 7 in a case that the end-gear 25 rotates in the gear-operation-angle range.

The malfunction detecting means determines that a malfunction occurs when the end-gear 25 rotates over the gear-operation-angle range and the detection value of the rotation angle sensor 7 is out of the normal detection values. A specific way of detecting a malfunction will be described hereinafter.

[Operation of First Embodiment]

(i) Normal Condition

In a case that the end-gear 25 and the shaft 5 are normally connected to each other, the end-gear 25 rotates from the full-open gear position to the full-close gear position. Also, the valve 4 rotates from full-open position to the full-close position. When the stopper-contacting portion 38 is brought into contact with the full-close stopper wall 44, the valve 4 stops rotating at the full-close position. The end-gear 25 also stops at the full-close gear position.

The rotation angle sensor 7 outputs detection signals which indicate the rotation angle of the end-gear 25 is within the gear-operation-angle range. Thus, the malfunction detecting means determines that no malfunction occurs.

(ii) Abnormal Condition

If the connecting portion between the end-gear 25 and the shaft 5 is broken, the end-gear 25 rotates over the full-close gear position. The end-gear 25 rotates free without respect to the full-close stopper wall 44. That is, the end-gear 25 rotates out of the gear-operation-angle range. At this moment, the rotation angle sensor 7 outputs detection signals which indicate the rotation angle of the end-gear 25 is out of the gear-operation-angle range. Thus, the malfunction detecting means determines that a malfunction occurs in a driving power transmitting path from the end-gear 25 to the shaft 5. Then, a warning lump is turned on to notify a passenger of the malfunction.

Besides, in a case that the detection value of the rotation angle sensor 7 is proportional to the opening degree of the valve, a lower limit value and an upper limit value of the detection value, which respectively correspond to the full-close position and the full-open position, are stored in a memory as a normal detection value of the rotation angle sensor 7 corresponding to the valve operation range. When the actual detection value becomes lower than the lower limit value, or when the actual detection value becomes higher than the upper limit value, it is determined that a malfunction occurs.

[Advantages of First Embodiment]

In the first embodiment, since the valve 4 is connected to the actuator 6 by press-inserting the shaft 5 into the end-gear 25, its manufacturing cost can be made lower.

The end-gear 25 can engage with the middle gear of the reduction-gears mechanism even in out of the gear-operation-angle range. The malfunction detecting means determines that a malfunction occurs when the end-gear 25 rotates over the gear-operation-angle range and the detection value of the rotation angle sensor 7 is out of the normal detection values corresponding to the valve operation range.

When the driving force is not transmitted from the end-gear 25 to the shaft 5 due to a malfunction, this malfunction can be detected by detecting the rotation angle of the end-gear 25. Thus, it is unnecessary to directly detect the rotation angle of the shaft 5 in order to find a malfunction. The manufacturing cost is not increased. A damage of a connecting portion of the shaft 5 and the end-gear 25 can be detected with low cost.

Further, according to the present embodiment, the maximum diameter of the stopper 35 is smaller than the diameter of the seal member 53. That is, the diameter of the stopper 35 is smaller than the inner diameter of the middle chamber 41. Thus, the end-gear 25, the shaft 5, and the seal member 53 are easily assembled in the accommodation chamber 17. Specifically, after the stopper 35 is arranged in the small chamber 42 through the middle chamber 41, the seal member 53 is assembled in the middle chamber 41. It is less likely that the stopper 35 conflicts with the seal member 53.

[Second Embodiment]

Figure 4A:
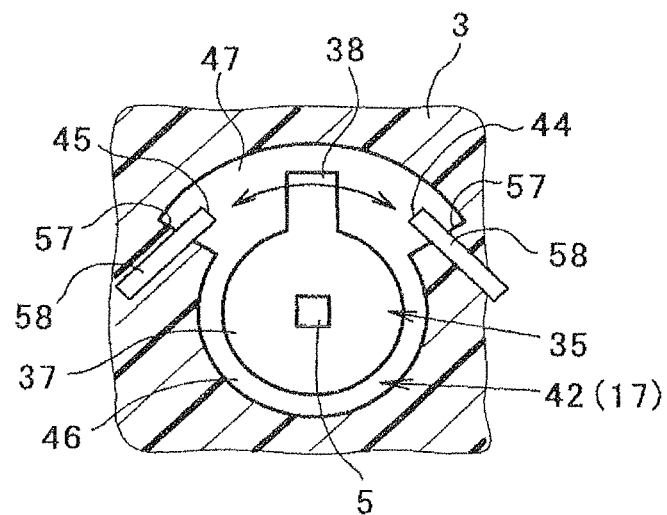
FIG. 4A is a cross sectional view showing a stopper.
Figure 4B:
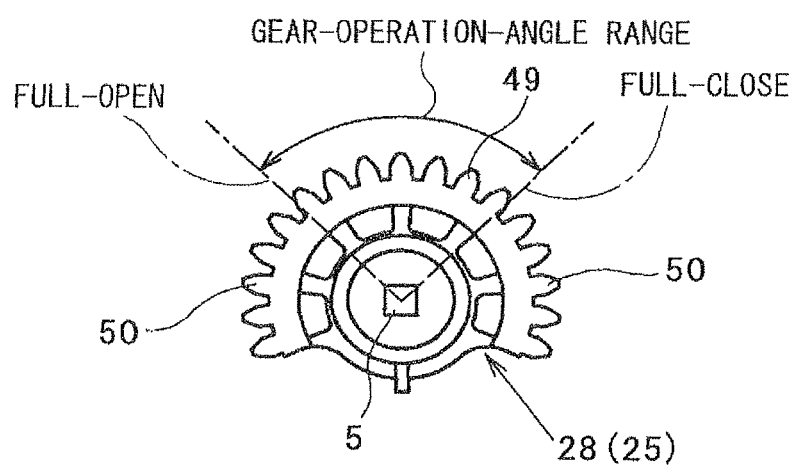
FIG. 4B is a plain view of an end-gear according to a second embodiment.

Referring to FIGS. 4A and 4B, a second embodiment will be described. In the second and the successive embodiments, the same parts and components as those in the first embodiment are indicated with the same reference numerals and the same descriptions will not be reiterated.

The second embodiment is different from the first embodiment in the configuration of the stopper. That is, stop-screws 58 are provided on step-surfaces 57 between the first small chamber 46 and the second small chamber 47. A tip end of the stop-screw 58 functions as a full-close position stopper 44, and a tip end of the other stop-screw 58 functions as a full-open position stopper 45.

In the second embodiment, the gear portion 28 has gear teeth partially along its circumferential periphery, as shown in FIG. 4B. That is, the inside gear teeth 49 are provided in the gear-operation-angle range, and the outside gear teeth 50 are provided at both sides of the inside gear teeth 49. The second embodiment has the same advantages as the first embodiment.

[Third Embodiment]

Figure 5:
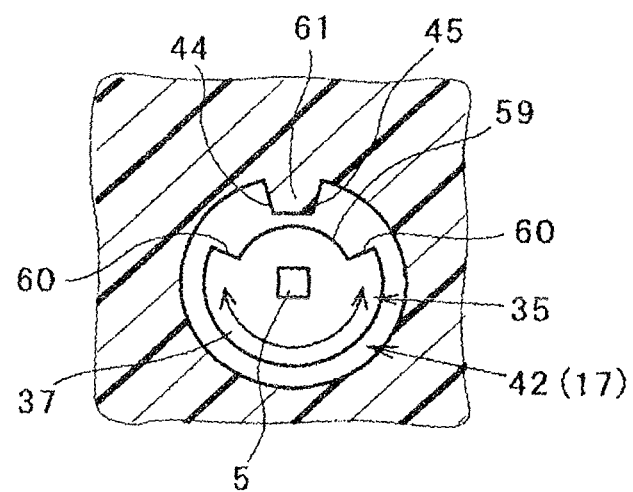
FIG. 5 is a cross sectional view showing a stopper according to a third embodiment.

Referring to FIG. 5, a third embodiment will be described. The third embodiment is different from the first embodiment in the configuration of the stopper and the stopper portion 35. The stopper portion 35 is comprised of a disc portion 37 and a concave portion 59. At circumferential both ends of the concave portion 59, step portions 60 are formed.

The inner diameter of the small chamber 42 is slightly larger than the outer diameter of the disc portion 37. A projection 61 is formed on an inner wall surface of the small chamber 42 in such a manner as to project toward the concave portion 59. One side surface of the projection 61 functions as the full-open position stopper 45, and the other side surface of the projection 61 functions as the full-close position stopper 44. These step portions 60 and stoppers 44, 45 regulate the operation angle range of the shaft 5. The third embodiment has the same advantages as the first embodiment.

[Modification]

The rotation angle sensor 7 can be arranged in such a manner as to detect the rotation angle of the actuator 6. That is, the rotation angle sensor 7 may detect the rotation angle of the output shaft of the electric motor, the motor gear, or the middle gear.

The detection value of the rotation angle sensor 7 may be ON-OFF signal. A switching position between ON-signal and OFF signal is previously stored. If the detection value is switched at improper switching position, it is determined that a malfunction occurs.

The present invention can be applied to a swirl-control-valve control apparatus, a throttle-valve control apparatus, or an EGR-valve control apparatus.

[Fourth Embodiment]

Referring to FIGS. 8A to 10B, a configuration of an electric driving apparatus will be described.

The electric drive apparatus 301 includes an electric motor 302. The electric drive apparatus 301 is applied to a tumble-control-valve (TCV) apparatus 304 which drives a tumble control valve 304.

That is, the TCV apparatus 304 is provided with the tumble control valve 303 and the electric motor 302. The tumble control valve 303 is rotatably supported in an intake manifold 306 to adjust the flow passage area of an intake passage 307.

The valve 303 is fixed on a valve shaft 308. The valve 303 has rectangular shape. The valve 303 has a notch portion 309.

The drive apparatus 301 is provided with the electric motor 302 and an electric current detecting means 311 which detects the electric current supplied to the electric motor 302. Further, the drive apparatus 301 is provided with a control means 312 which controls the energization of the electric motor 302 and a driving circuit 314 which turns on/off the electric motor 302 according to a control signal from the control means 312.

The electric motors 302 is a well-known DC motor which is comprised of a rotor 318 having a plurality of coils 316 and a plurality of commutator 317, a stator 320 having a plurality of magnets 319, and two brushes 321a, 321b.

The electric current detecting means 311 is a well-known electric current detecting circuit which detects electric current supplied to the electric motor 302 based on voltage drop in a shunt resistance 324.

The control means 312 is a microcomputer having a CPU, a ROM, a RAM, an input device and an output device.

The driving circuit 314 has four switching elements 325 to rotate the electric motor 302 in the normal direction or the reverse direction.

The rotation torque generated by the electric motor 302 is transmitted to the valve shaft 308 thorough a reduction-gears mechanism. The valve shaft 308 is concentrically connected to an end-gear 326 of the reduction-gears mechanism. An end portion 326a of the end-gear 326 is supported by the intake manifold 306 through an oil-seal 327.

A stopper 329 is provided to the valve shaft 308.

The stopper 329 is comprised of a disc portion 330 and a stopper-contacting portion 331 which radially outward protrudes from the disc portion 330. The stopper 329 is rotatably accommodated in a chamber 332.

The chamber 332 is comprised of a first chamber 333 and a second chamber 334. The disc portion 330 is accommodated in the first chamber 333 and the stopper-contacting portion 331 is accommodated in the second chamber 334. Both end walls of the second chamber 334 define stopper walls 335, 336.

When the stopper-contacting portion 331 is in contact with the stopper wall 335 or the other stopper wall 336, the valve 303 is mechanically held. When the valve 303 is full-closed, the stopper-contacting portion 331 is in contact with the full-close stopper wall 335. When the valve 303 is full-opened, the stopper-contacting portion 331 is in contact with the full-open stopper wall 336.

Thus, even if the valve 303 receives the rotation torque from the electric motor 302, the valve 303 does not rotate over the full-close stopper wall 335 or the full-open stopper wall 336.

When the stopper-contacting portion 331 is brought into contact with one of the stopper walls 335, 336 (hold condition), the electric current supplied to the electric motor 302 is stepwise increased.

Figure 9A:
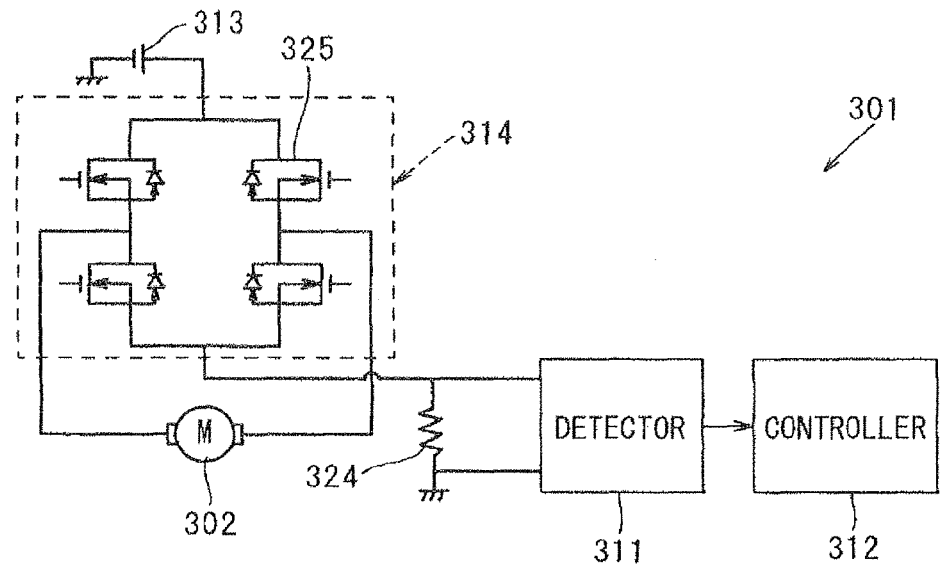
FIG. 9A is a chart showing a circuit configuration of an electric driving apparatus.
Figure 9B:
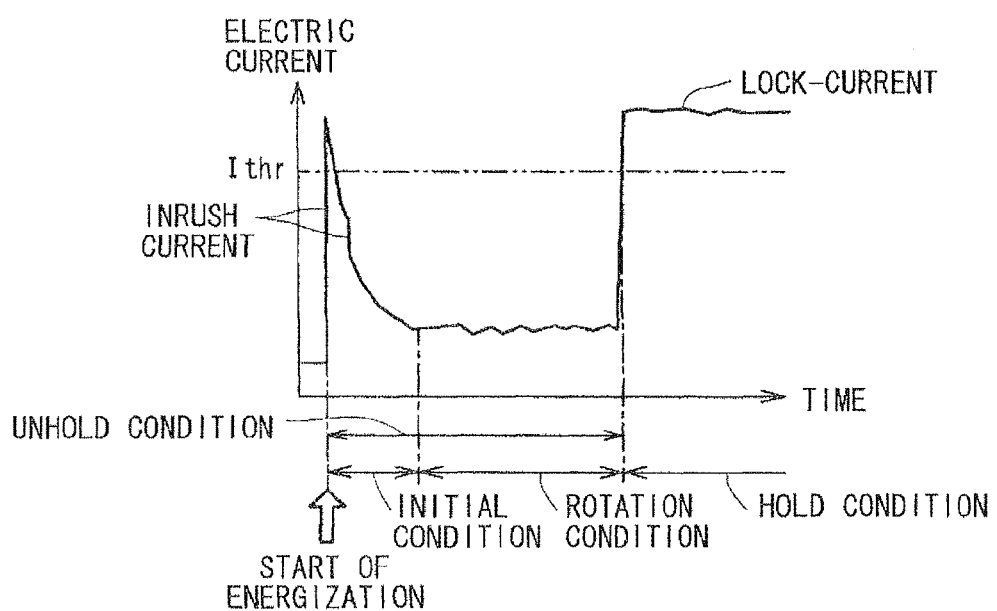
FIG. 9B is a graph showing an electric current supplied to the electric motor.

When the valve 303 rotates to the full-open position or the full-close position, the electric current supplied to the electric motor 302 varies as shown in FIG. 9B. That is, when the electric motor 302 is energized, the electric current is temporarily rapidly increased due to an inrush current, and then the electric current is decreased. When the valve 303 is mechanically held, the electric current supplied to the electric motor 302 is stepwise increased. The unhold condition is comprised of an initial condition and a rotation condition. In the initial condition, the electric current supplied to the electric motor 302 is steeply varied due to the inrush current. In the rotation condition, the electric current supplied to the motor 302 is constant and the valve 303 rotates in a constant speed. It should be noted that the electric current of the time when the valve 303 is mechanically held is referred to as a lock-current.

The control means 312 stores a threshold "Ithr" with respect to the electric current supplied to the motor 302. When the electric current is temporarily increased and decreased due to the inrush current, and then exceeds the threshold "Ithr", the control means 312 determines that the valve 303 is normally brought into the hold condition.

That is, after the electric motor 302 is energized, the electric current exceeds the threshold "Ithr" temporarily due to the inrush current. Then, the electric current is lowered than the threshold "Ithr". After that, when the electric current excesses the threshold "Ithr" again, it is determined that the valve 303 is normally full-closed or full-opened.

With respect to the temporal increase and decrease in electric current due to the inrush current, after the electric current is lowered than the threshold "Ithr", when the absolute value of the temporal variation rate of the electric current is lowered than a specified convergence value, the control means 312 determines that a temporal increase and decrease in electric current due to the inrush current has been converged.

Further, the control means 312 functions as a lock-current estimating means which estimates the lock-current. When the valve 303 is in the hold condition, the rotor 318 stops, and each of the brushes 321a, 321b is in contact with a single commutator 317, the lock-current is denoted by "Ia". When at least one of brushes 321a, 321b is in contact with two commutators 317, the lock-current is denoted by "Ib". The control means 312 stores a lock-current ratio "Ia/Ib". The estimated lock-current is denoted by "Iss". The threshold "Ithr" is defined in such a manner as not to exceed an upper value which is obtained by multiplying "Iss" by "Ia/Ib".

Figure 10A:
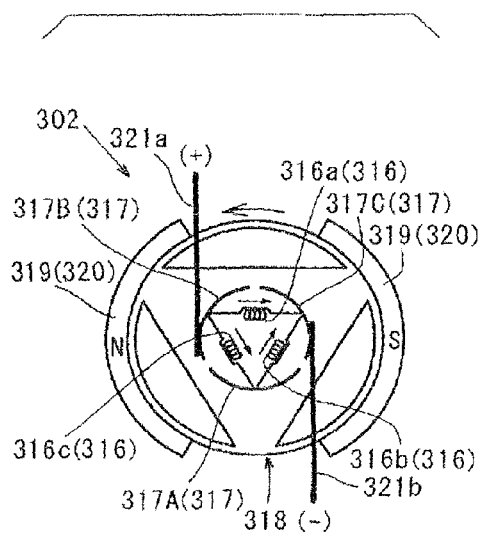
FIG. 10A is a chart for explaining a lock-current in a case that both brushes are in contact with a single commutator.
Figure 10A:
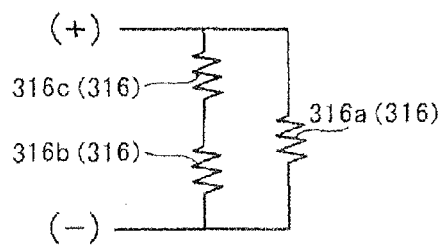
Figure 10B:
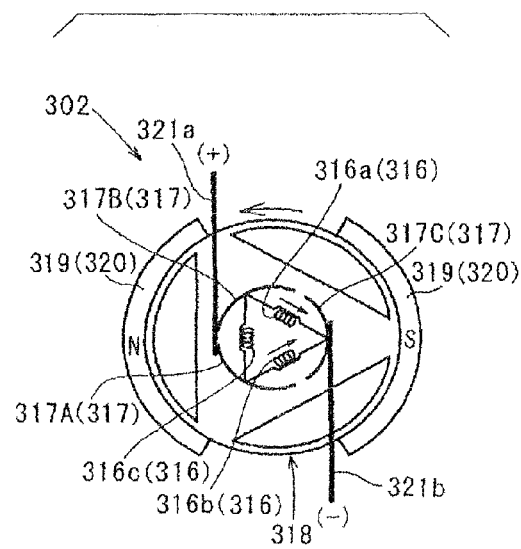
FIG. 10B is a chart for explaining a lock-current in a case a single brush is in contact with two brushed.
Figure 10B:
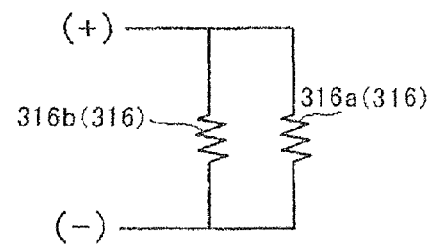

For example, as shown in FIGS. 10A and 10B, the electric motor 302 has three-phase coils 316a-316c in delta connection. Each of commutators 317A-317C is connected to the coils 316a-316c. The resistance value of the coils 316a-316c is denoted by "r".

FIG. 10A shows a case in which each of brushes 321a, 321b is in contact with only the corresponding commutator 317B, 317C. The lock-current is denoted by "Ia". FIG. 10B shows a case in which the brush 321a is in contact with the commutators 317A, 317B and the brush 321b is in contact with only the commutator 317C. The lock-current is denoted by "Ib".

In a case shown in FIG. 10A, the combined resistance between the brushes 321a, 321b is expressed by "r×(⅔)". In a case shown in FIG. 10B, the combined resistance between the brushes 321a, 321b is expressed by "r×(½)". Thus, the ratio "Ia/Ib" is 0.75 and the threshold "Ithr" is defined so as to be smaller than an upper value (=Iss×0.75).

In a case that the electric motor 302 has (2N+1)-phase coils 316, the ratio "Ia/Ib" can be expressed by (2N+1)/(2(N+1)). In a case that the electric motor 302 has 2N-phase coils 316, the ratio "Ia/Ib" can be expressed by (2N−1)/(2 (N−1)).

After it is determined that the valve 303 is normally brought into the hold condition, the lock-current estimating means defines an average of a plurality of detection current detected by the electric current detecting means 311 as an estimation value "Iss" of the lock-current.

When the valve 303 is rotated to the hold condition next time, the control means 312 defines the threshold "Ithr" smaller than the upper value (=Iss×(Ia/Ib)), and determines whether the valve 303 is normally full-closed or full-opened.

Further, the control means 312 integrates the electric current from when the electric motor 302 is energized until when the electric current is stepwise increased. Based on the integrated value, the control means 312 determines whether the rotational position of the valve 303 is normal. That is, in a case that the electric motor 302 is a DC motor, a rotation speed N(t) [rad/s] of the motor 302 and the electric current I(t) has a linear relation as expressed by following formula (1).

$$N(t)=a-b \cdot I(t) \tag{1}$$

In a case that a time period and a rotation angle of the motor 302 from when the electric motor 302 is energized until when the electric current is stepwise increased are respectively expressed by T1 [s] and θ [rad], the rotation angle θ can be computed by definite-integrating the rotation speed N(t) from 0 to T1 with respect to time "t". Thus, the rotation angle θ can be expressed by following formula (2).

$$\theta = a \cdot T1 + b \cdot \int_0^{T1} I(t) dt \tag{2}$$

As above, since the rotational position of the valve 303 corresponds to the rotational angle of the electric motor 302, it can be determined whether the rotational position of the valve 303 is normal based on the above integrated value.

[Control Processing of Fourth Embodiment]

Figure 11:
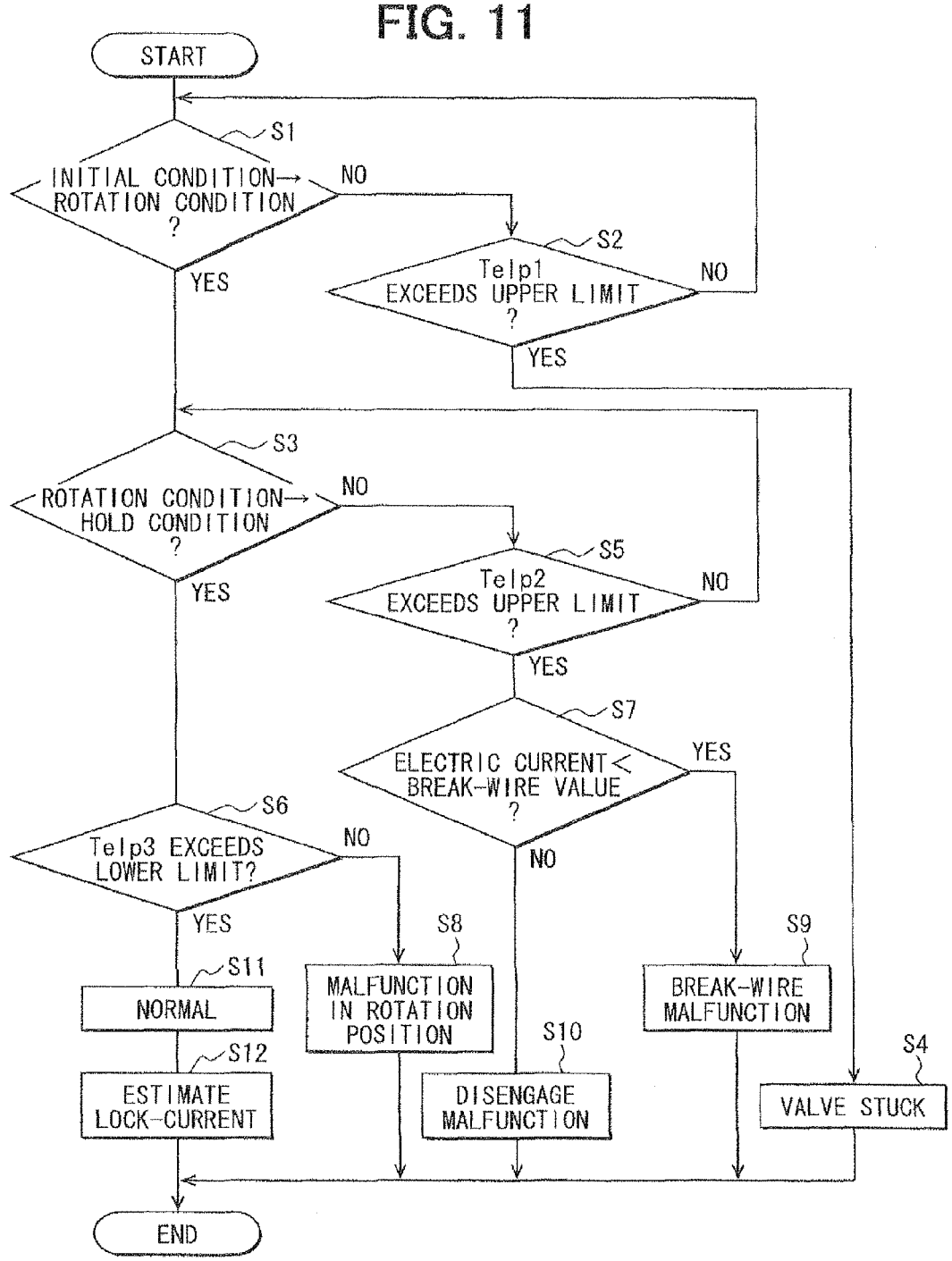
FIG. 11 is a main flowchart for operating an electric driving apparatus according to the fourth embodiment.
Figure 12:
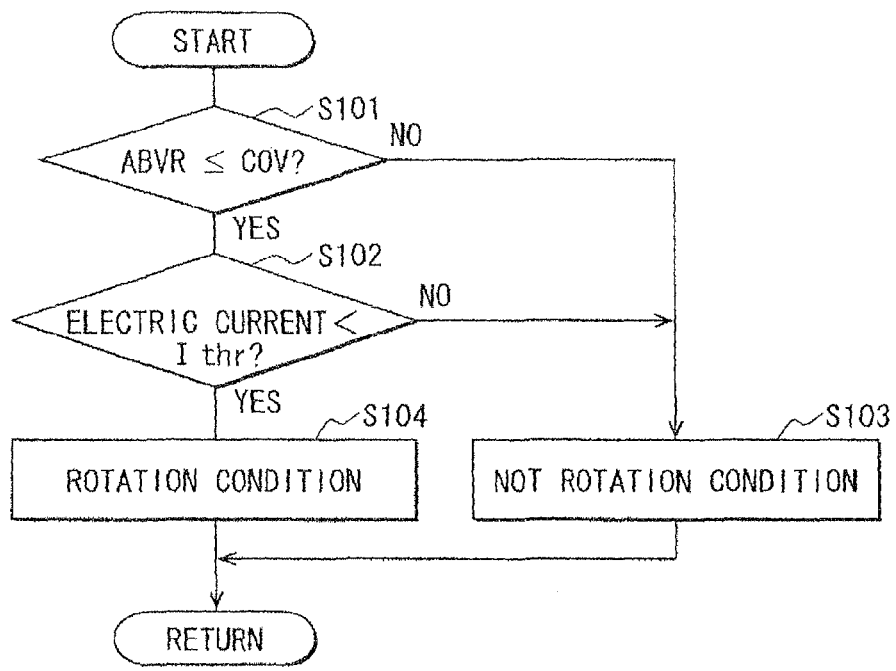
FIG. 12 is a sub-flowchart for operating an electric driving apparatus according to the fourth embodiment.
Figure 13:
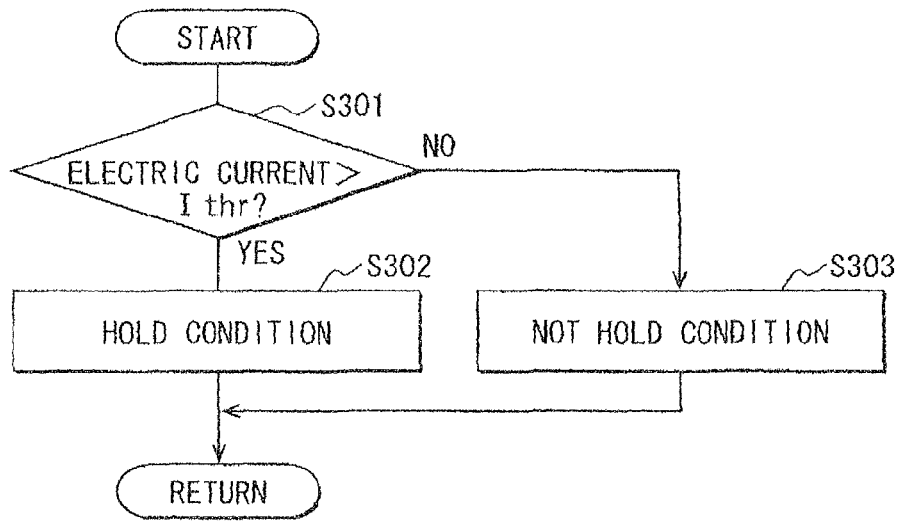
FIG. 13 is another sub-flowchart for operating an electric driving apparatus according to the fourth embodiment.

Referring to FIGS. 11 to 13, a control processing of the driving apparatus 301 will be described hereinafter.

FIG. 11 is a main flowchart of a processing in which it is determined whether the rotational position of the valve 303 normally reaches the full-close position in a case that the valve 303 rotates from the full-open position toward the full-close position. This flowchart starts when the electric motor 302 is energized.

In step S1, the computer determines whether the valve 303 has moved from the initial condition to the rotation condition. When the answer is NO, the procedure proceeds to step S2. When the answer is YES, the procedure proceeds to step S3.

The determination of whether the valve 303 has moved from the initial condition to the rotation condition is conducted by executing a sub-flowchart shown in FIG. 12.

In step S101, the computer determines whether an absolute value "ABVR" of a temporal variation ratio of the electric current is lower than or equal to a specified convergent value "COV". An absolute value of a difference value between the currently detected electric current and the previously detected electric current is defined as the absolute value of the temporal variation ratio of the electric current.

When the answer is YES in step S101, the procedure proceeds to step S102. When the answer is NO in step S101, the procedure proceeds to step S103. In step S103, the computer determines that the valve 303 has not moved to the rotation condition. The procedure goes back to step S1 of the main flowchart. The answer in step S1 is NO.

In step S102, the computer determines whether the electric current is less than the threshold "Ithr". When the answer is YES in step S102, the procedure proceeds to step S104. When the answer is NO in step S102, the procedure proceeds to step S103. In step S103, the computer determines that the valve 303 has not moved to the rotation condition. The procedure goes back to step S1 of the main flowchart. The answer in step S1 is NO.

In step S104, the computer determines that the valve 303 has moved to the rotation condition. The procedure goes back to step S1 of the main flowchart. The answer in step S1 is YES.

In step S2, the computer determines whether an elapsed time "Telp1" from energization of the motor 302 exceeds an upper limit time of the initial condition. When the answer is NO in step S2, the procedure goes back to step S1. When the answer is YES in step S2, the procedure proceeds to step S4 in which the computer determines that the valve 303 is stuck. The upper limit time of the initial condition is defined based on a time period which is required to converge the temporal increase/closed in electric current due to the inrush current.

In step S3, the computer determines whether the valve 303 has moved from the rotation condition to the hold condition. When the answer is NO, the procedure proceeds to step S5. When the answer is YES, the procedure proceeds to step S6.

The determination of whether the valve 303 has moved from the rotation condition to the hold condition is conducted by executing a sub-flowchart shown in FIG. 13.

In step S301, the computer determines whether the electric current is greater than the threshold "Ithr". When the answer is YES in step S301, the procedure proceeds to step S302. When the answer is NO in step S301, the procedure proceeds to step S303.

In step S302, the computer determines that the valve 303 has moved to the hold condition. The procedure goes back to step S3 of the main flowchart. The answer in step S3 is YES. In step S303, the computer determines that the valve 303 has not moved to the hold condition. The procedure goes back to step S3 of the main flowchart. The answer in step S3 is NO.

In step S5, the computer determines whether an elapsed time "Telp2" after the valve 303 has moved to the rotation condition exceeds a specified upper limit time. When the answer is NO, the procedure goes back to step S3. When the answer is YES, the procedure proceeds to step S7.

In step S6, the computer determines whether an elapsed time "Telp3" after the valve 303 has moved to the rotation condition exceeds a specified lower limit time. When the answer is NO in step S6, the procedure proceeds to step S8 in which the computer determines that a malfunction exists in the rotation position of the valve 303.

The upper limit time and the lower limit time of the rotation condition are defined based on a time period which is necessary for the valve 303 to rotate from the full-open position to the full-close position. It should be noted that when the rotation quantity of the valve 303 from the full-open position is excessively small, it is determined that a malfunction exists in the rotation position of the valve 303.

In step S7, the computer determines whether the electric current is smaller than a break-wire value. The break-wire value is a reference value for determining whether a breaking of wire occurs in the electric motor 302. When the answer is YES in step S7, the procedure proceeds to step S9 in which the computer determines that a breaking of wire occurs. When the answer is NO in step S7, the procedure proceeds to step S10 in which the computer determines that a disengage malfunction occurs.

The disengage malfunction represents that a disengagement occurs in a torque transmitting path between the electric motor 302 and the valve shaft 308. For example, when a connecting portion between the valve shaft 308 and the end-gear 326 is broken, the end-gear 326 is disengaged from the valve shaft 308. Such a breakage is referred to as a disengage malfunction.

When the answer is NO in step S6, the procedure proceeds to step S11 in which the valve 303 is normally rotated form the full-open position to the full-close position. Then, the procedure proceeds to step S12 in which the lock-current is estimated to end the main flowchart.

The control means 312 functions as a lock-current estimating means by executing step S12.

[Advantages of Fourth Embodiment]

In a case that the valve 303 rotates from the full-open position to the full-close position, the control means 312 stores the threshold "Ithr" for determining whether the valve 303 is normally full-closed. After the electric motor 302 is energized, the electric current exceeds the threshold "Ithr" temporarily due to the inrush current. Then, the electric current is lowered than the threshold "Ithr". After that, when the electric current excesses the threshold "Ithr" again, it is determined that the valve 303 is normally full-closed.

Thereby, based on the appropriately established threshold "Ithr", it is able to correctly determine whether the valve 303 is surely moved from the rotation condition to the hold condition.

If the valve 303 has not moved from the rotation condition to the hold condition, the computer determines that the valve 303 is stuck in step S4, a malfunction exists in the rotation position of the valve 303 in step S8, a breaking of wire occurs in step S9, or the disengage malfunction occurs in step S10.

Also, after the electric current is lowered than the threshold "Ithr", when the absolute value of the temporal variation rate of the electric current is lowered than the specified convergence value, the control means 312 determines that the inrush current has been converged and the valve 303 has moved from the initial condition to the rotation condition. Thereby, even though the time period required to converge the inrush current fluctuates, the convergence of the inrush current can be surely detected.

The control means 312 stores the ratio "Ia/Ib" and the threshold "Ithr" is defined in such a manner as not to exceed an upper value which is obtained by multiplying "Iss" by "Ia/Ib". Thereby, without respect to a contact condition between the brushes 321a, 321b and the commutators 317A-317C, it is surely determined whether the valve 303 has normally moved from the unhold condition to the hold condition.

Further, the control means 312 integrates the electric current from when the electric motor 302 is energized until when the electric current is stepwise increased. Based on the integrated value, the control means 312 determines whether the rotational position of the valve 303 is normal. Since the electric current supplied to the electric motor 302 and the rotation speed of the motor 302 has a liner correlation, the above integrated value and the rotation angle of the motor 302 has also liner correlation. The rotation angle of the motor 302 corresponds to the rotational position of the valve 303 one-on-one. Therefore, it can be determined whether the rotational position of the valve 303 is normal based on the integrated value with high accuracy.

[Fifth Embodiment]

Figure 14:
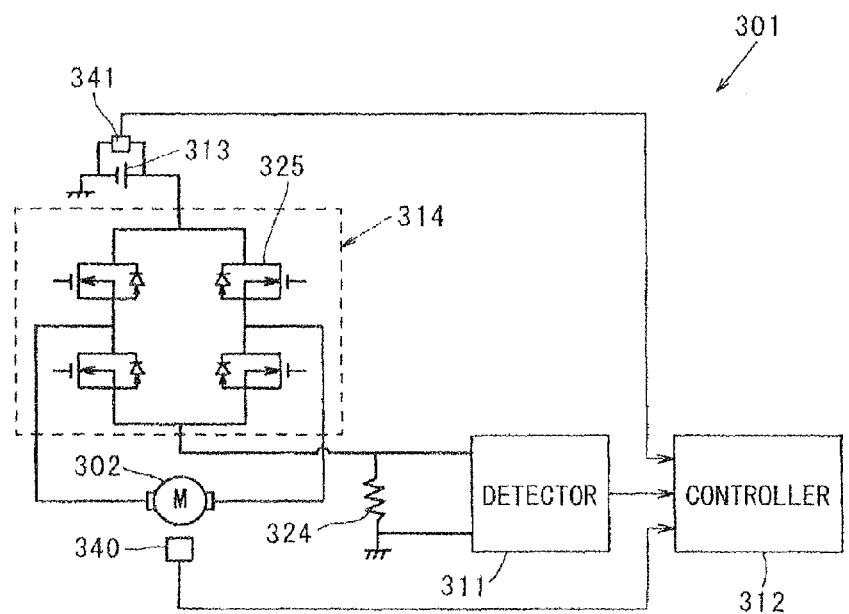
FIG. 14 is a chart showing a circuit configuration of an electric driving apparatus according to a fifth embodiment.

As shown in FIG. 14, the driving apparatus 301 is provided with a temperature estimating means 340 which estimates ambient temperature around the electric motor 302, and a voltage detecting means 341 which detects voltage of electric power source 313. The electric motor 302 receives electricity from the electric power source 313. The voltage detecting means 341 is a well-known voltage detecting circuit which outputs detection signal to the control means 312. The temperature estimating means 340 is a water-temperature sensor which detects engine coolant temperature. The ambient temperature around the motor 302 is estimated based on the engine coolant temperature.

Figures 15A, 15B:
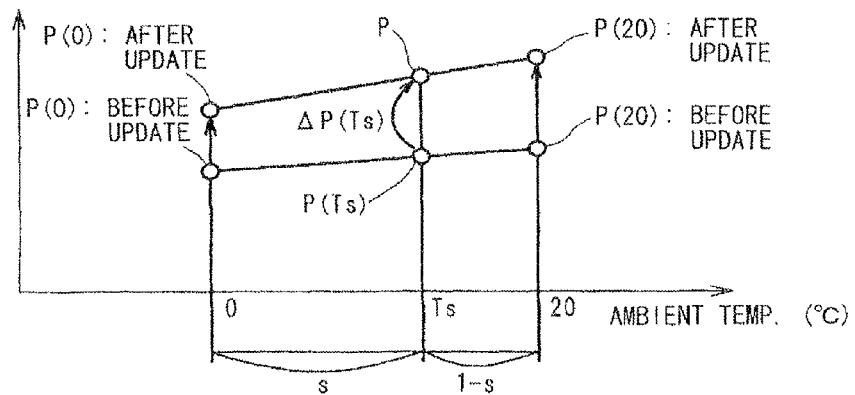
FIG. 15A is a chart showing a table data according to the fifth embodiment.
FIG. 15B is a chart for explaining an update of the table data according to the fifth embodiment.

Also, the control means 312 stores a ratio between the lock-current and the power source voltage as a function P(T) of the ambient temperature T. This ratio is referred to as hold-condition conductance. More specifically, as shown in FIG. 15A, the control means 312 stores the ambient temperature and the hold-condition conductance as a table data of "T" and "P(T)".

The control means 312 applies the estimation value of the ambient temperature to the function P(T) to compute the hold-condition conductance. The control means 312 computes an estimation value "Iss" of the lock-current by multiplying the hold-condition conductance and the detection value of the power source voltage.

The threshold "Ithr" is defined in such a manner as not to exceed an upper value which is obtained by multiplying "Iss" and "Ia/Ib".

Furthermore, the control means 312 corrects the function P(T) based on the detected electric current, the estimated ambient temperature around the motor 302, and the detected power source voltage. Specifically, the detected value of the lock-current is divided by the detected value of the power source voltage so that the actual measured value "P" of the hold-condition conductance is computed. Based on the actual measured value "P", the table data of the function P(T) is updated.

For example, in a case that the estimated value of the ambient temperature around the motor 302 is Ts° C. (0° C.<Ts<20° C.), a ratio between a difference (Ts−0) and a difference (20−Ts) is defined as "s: (1−s)" (0<s<1), the hold-condition conductance obtained based on not-updated P(0) and P(20) is denoted by P(Ts), and the difference between "P" and "P(Ts)" is denoted by "ΔP(Ts)".

In this case, after a weighting is performed with respect to not-updated P(0) and P(20) according to Ts° C., the updated P(0) and P(20) are expressed as follows:

Updated $P(0)$=not-updated $P(0)+k \cdot (1-s) \cdot \Delta P(Ts)$

Updated $P(20)$=not-updated $P(20)+k \cdot s \cdot \Delta P(Ts)$ wherein $k=1/(2s^2-2s+1)$.

[Advantages of Fifth Embodiment]

According to the fifth embodiment, the driving apparatus 301 is provided with a temperature estimating means 340 which estimates the ambient temperature around the electric motor 302, a voltage detecting means 341 which detects the power source voltage. The control means 312 computes the hold-condition conductance based on the table data which shows a relation between the ambient temperature around the motor 302 and the hold-condition conductance. Further, the estimation value "Iss" of the lock-current is computed by multiplying the hold-condition conductance and the detection value of the power source voltage. Thereby, the estimation value "Iss" of the lock-current can be computed in view of the thermal characteristic.

Further, the control means 312 corrects the table data based on the detected value of the electric current supplied to the motor 302, the estimation value of the ambient temperature around the motor 302 and the detection value of the power source voltage. Thereby, even if the characteristics of the electric motor 302 are varied with age, the hold-condition conductance in the table data can be updated with high accuracy. Even if the characteristics of the electric motor 302 are varied with age, the lock-current can be estimated with high accuracy.

[Sixth Embodiment]

Figure 16A:
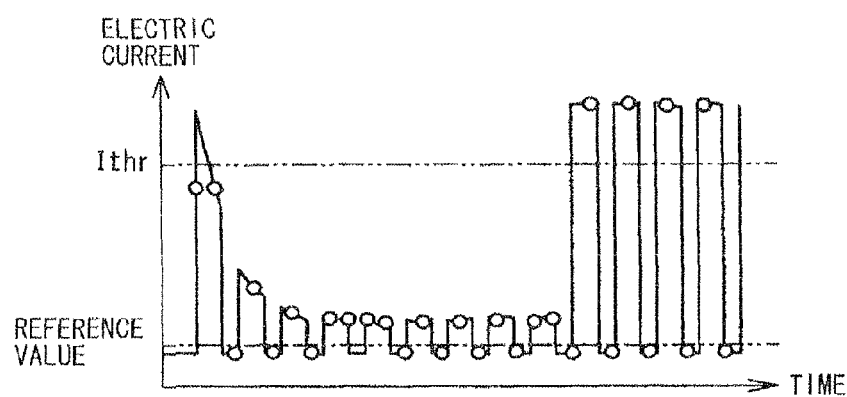
FIG. 16A is a graph showing an electric current supplied to the electric motor according to a sixth embodiment.
Figure 16B:
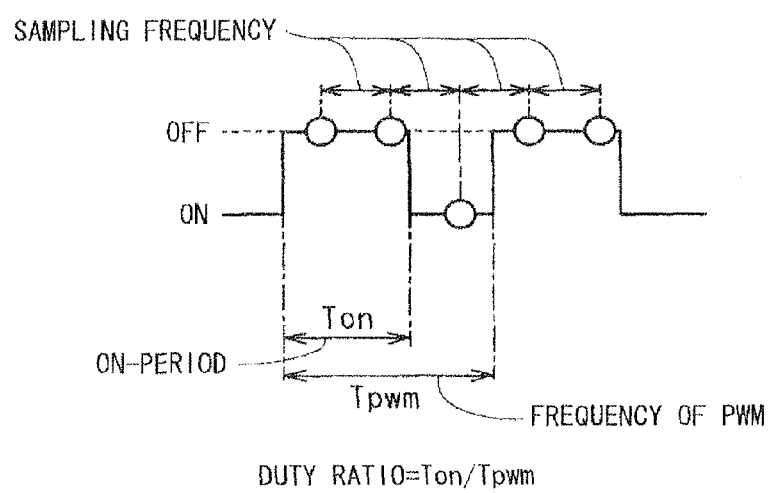
FIG. 16B is a graph showing a relationship between a frequency of PWM-signal and a sampling frequency.
Figure 17:
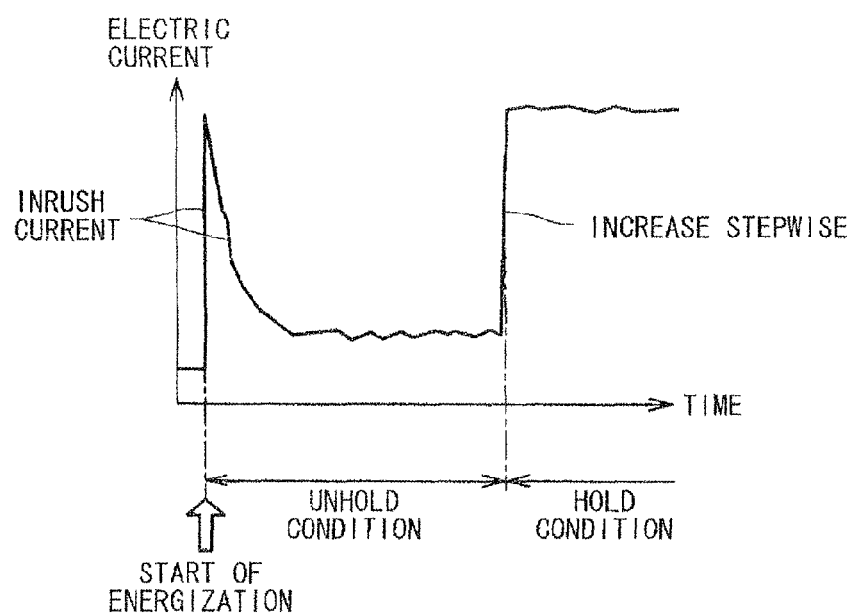
FIG. 17 is a graph showing an electric current for explaining a conventional driving apparatus.

According to a sixth embodiment, as shown in FIGS. 16A and 16B, the control means 312 outputs PWM-signals to four switching elements 325 of a driving circuit 314 so that the energization of the motor 302 is controlled. A sampling frequency at which the control means 312 obtains the detection values from the current detecting means 311 is greater than a value which is obtained by dividing the frequency of the PWM-signals by a duty ratio of the PWM-signals. Thereby, since the detection value of the electric current is surely obtained during ON-period of the PWM-signals, it can be avoided that the detection value of the electric current is obtained only during OFF-period of the PWM-signals.

Figure 6:
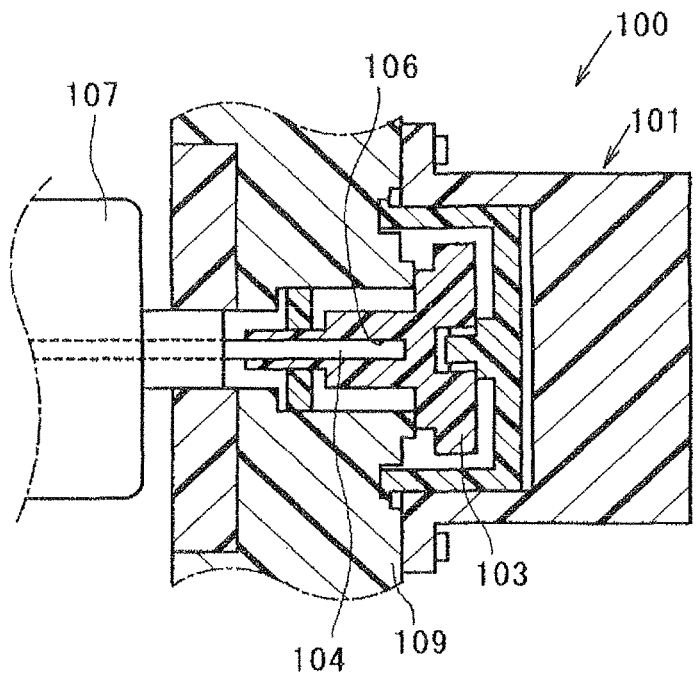
FIG. 6 is a cross sectional view showing a conventional valve control apparatus.
Figure 7:
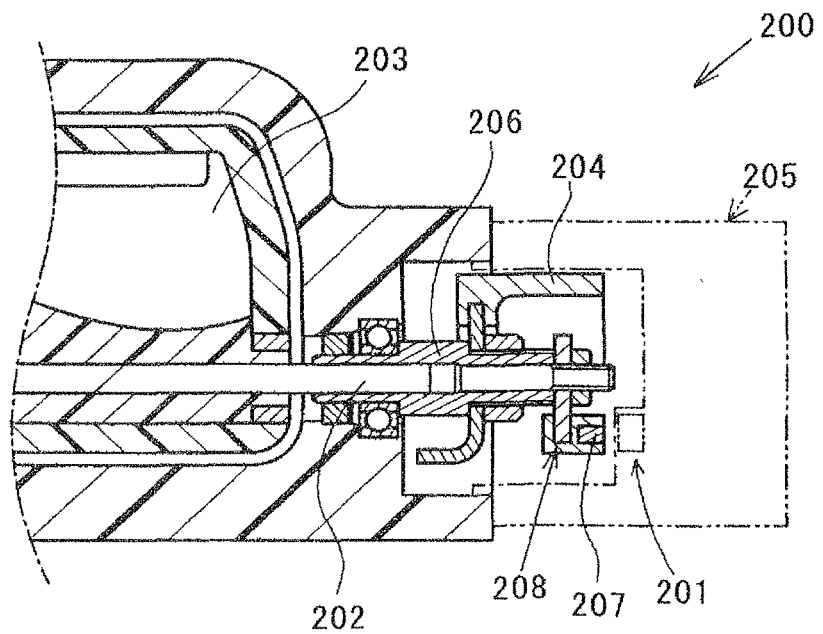
FIG. 7 is a cross sectional view showing a conventional valve control apparatus.
Figure 8A:
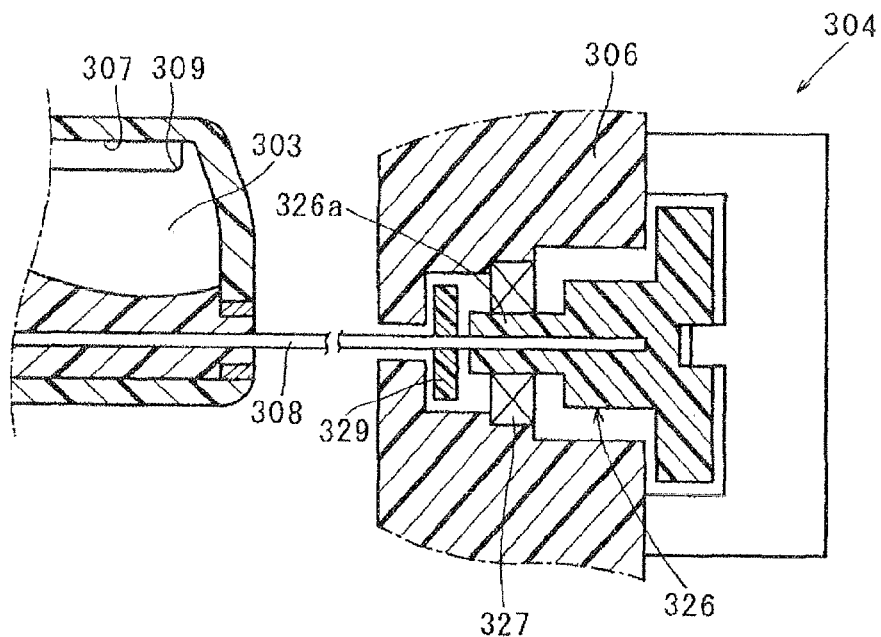
FIG. 8A is a cross sectional view showing an essential part of a TCV apparatus according to a fourth embodiment.
Figure 8B:
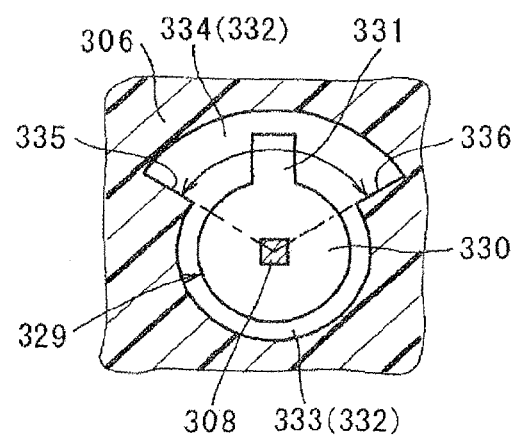
FIG. 8B is a cross sectional view showing a stopper configuration of the TCV apparatus according to the fourth embodiment.

The control means 312 does not use detection value which is lower than a reference value, when executing processings shown in FIGS. 4-6. Thus, erroneous determinations can be avoided.

[Modification]

The driving apparatus 301 is not limited to the above embodiments. For example, it can be determined whether the rotational position of the valve 303 normally reaches the full-open position in a case that the valve 303 rotates from the full-close position toward the full-open position.

The hold condition can be generated at a middle position between the fuel-open position and the full-close position. The driving apparatus can be applied to a throttle valve control apparatus or an EGR gas control apparatus.

In the above embodiments, the valve 303 is a butterfly valve. Alternatively, the valve 303 may be a poppet valve or a needle valve.

In a case that the valve 303 is a poppet valve, the driving apparatus 301 controls a linear movement of the poppet valve.

What is claimed is:

1. An electric driving apparatus comprising:
   an electric motor generating a driving force while receiving an electric current;
   an electric current detecting means for detecting the electric current supplied to the electric motor, and
   a control means for controlling an energization to the electric motor so that the driving force is transmitted to a driven member in order to vary a displacement magnitude which represents at least one of a variation in position of the driven member and a variation in posture of the driven member, wherein
   the displacement magnitude includes a hold value at which the driven member is mechanically held and the displacement magnitude does not vary even though the driving force is continued to be transmitted from the electric motor to the driven member so as to vary the displacement magnitude in one direction,
   the electric current supplied to the electric motor is stepwise increased when the displacement magnitude reaches the hold value after the displacement magnitude has been varied in one direction, the control means stores a threshold regarding the electric current supplied to the electric motor for determining whether the displacement magnitude normally reaches the hold value in a case that the electric motor is controlled in such a manner that the displacement magnitude reaches the hold value after the displacement magnitude has been varied in one direction, after the electric motor is energized, the electric current exceeds the threshold temporarily due to the inrush current, then the electric current is lowered than the threshold, and when the electric current excesses the threshold again, the control means determines that the displacement magnitude has normally reached the hold value, the electric motor includes a rotor having a plurality of coils and a plurality of commutators, a stator having a plurality of magnets, and two brushes being in contact with the commutators to supply the electric current to the coils, the electric motor generates a rotational torque, the control means includes a lock-current estimating means for estimating a lock-current which is supplied to the electric motor after the displacement magnitude has reached the hold value, when the displacement magnitude reaches the hold value, the rotor stops and each of the brushes is in contact with the single commutator, the lock-current is denoted by "Ia", when at least one of brushes is in contact with the multiple commutators, the lock-current is denoted by "Ib", the control means stores a lock-current ratio "Ia/Ib", and the threshold is defined in such a manner as not to exceed an upper value which is obtained by multiplying the estimated lock-current and the lock-current ratio "Ia/Ib".

2. An electric driving apparatus according to claim 1, wherein
after the electric current is lowered than the threshold, when an absolute value of a temporal variation rate of the electric current is lowered than a specified convergence value, the control means determines that a temporal increase and decrease in electric current due to the inrush current has been converged.

3. An electric driving apparatus according to claim 1, wherein
the lock-current estimating means defines an average value of a plurality of electric current values detected by the electric current detecting means as the estimation value of the lock-current after it is determined that the displacement magnitude normally reaches the hold value.

4. An electric driving apparatus according to claim 1, further comprising:

a temperature estimating means for estimating an ambient temperature around the electric motor;

a power source voltage detecting means for detecting a voltage of a power source which supplies an electricity to the electric motor, wherein the lock-current estimating means stores a ratio between the lock-current and the power source voltage as a function of the ambient temperature around the electric motor, the lock-current estimating means computes said ratio between the lock-current and the power source voltage by applying the estimated value of the ambient temperature to the function, and the lock-current estimating means computes an estimation value of the lock-current by multiplying said ratio and the power source voltage.

5. An electric driving apparatus according to claim 4, wherein
after it is determined that the displacement magnitude normally reaches the hold value, the lock-current estimating means corrects the function based on a detection value of the electric current detected by the electric current detecting means, an estimate value of the ambient temperature around the electric motor estimated by the temperature estimating means, and a detection value of the power source voltage detected by the power source voltage detecting means.

6. An electric driving apparatus according to claim 1, wherein
the control means integrates the electric current supplied to the electric motor from when the electric motor is energized until when the electric current is stepwise increased, and
the control means determines whether the displacement value is normal based on the integrated value.

7. An electric driving apparatus according to claim 1, further comprising
a driving circuit which turns on/off the electric motor according to a control signal from the control means, wherein
the control means outputs a PWM-signal as the control signal to the driving circuit to control an energization of the electric motor, and
a sampling frequency at which the control means obtains the detection values from the current detecting means is greater than a value which is obtained by dividing the frequency of the PWM-signal by a duty ratio of the PWM-signal.

* * * * *